United States Patent [19]

Chartet

[11] 4,159,035
[45] Jun. 26, 1979

[54] TUBE AND TUBE-PLATE ASSEMBLY WITH SOFT JOINTS

[75] Inventor: André Chartet, Meudon, France

[73] Assignee: Societe Anonyme des Usines Chausson, Asnieres, France

[21] Appl. No.: 713,014

[22] Filed: Aug. 9, 1976

Related U.S. Application Data

[62] Division of Ser. No. 572,450, Apr. 28, 1975, Pat. No. 4,044,443.

[30] Foreign Application Priority Data

May 30, 1974 [FR] France .................................. 74 18840

[51] Int. Cl.² .............................................. F28F 9/04
[52] U.S. Cl. ...................................... 165/173; 165/69; 165/76; 165/82; 285/189
[58] Field of Search ..................... 165/180, 81, 82, 83, 165/133, 134, 173, 175, 176, 178, DIG. 8, 76, 69; 29/157.4; 285/158, 189, 196

[56] References Cited

U.S. PATENT DOCUMENTS

| | | | |
|---|---|---|---|
| 2,281,594 | 5/1942 | Pearl | 165/180 |
| 2,447,259 | 8/1948 | Lucke | 165/178 |
| 2,816,739 | 12/1957 | Stoehr | 165/83 |
| 3,001,766 | 9/1961 | Laist | 165/DIG. 8 |
| 3,332,479 | 7/1967 | Martin, Jr. | 165/178 |
| 3,447,603 | 6/1969 | Jones | 165/178 |
| 3,583,478 | 6/1971 | Fieni | 165/178 |

*Primary Examiner*—Sheldon Jay Richter
*Attorney, Agent, or Firm*—Browdy and Neimark

[57] ABSTRACT

Tube passages slightly bigger than the tubes are formed in a plate. A soft resilient sheet is placed on one side of the plate. The tube is forcibly inserted in the tube passages and draws a portion of the sheet which is then cut. In the assembly the sheet, which has a bigger thickness than the interval between the tube and the tube passage, forms a flange beyond the tube plate.

9 Claims, 12 Drawing Figures

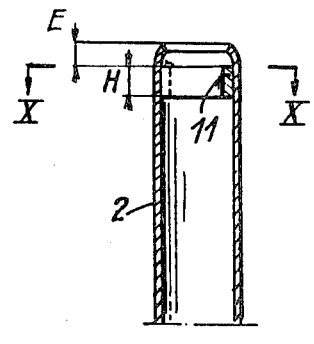
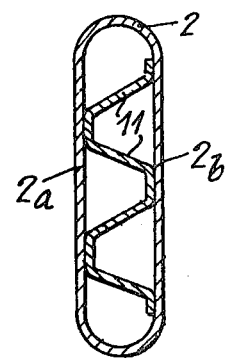
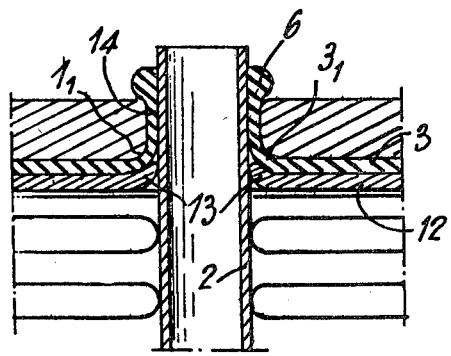
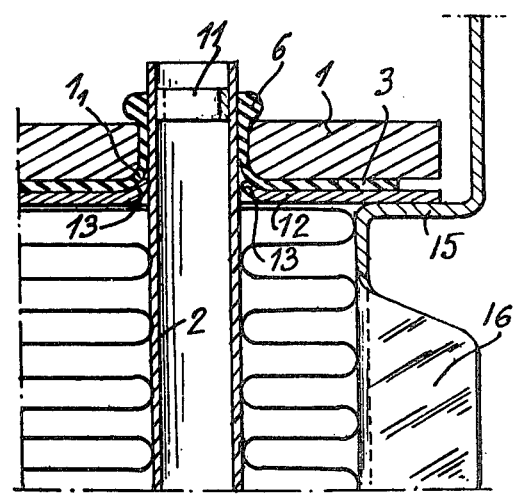

TUBE AND TUBE-PLATE ASSEMBLY WITH SOFT JOINTS

This is a division of application Ser. No. 572,450, filed Apr. 28, 1975, now U.S. Pat. No. 4,044,443.

The present invention relates to a new method for tightly assembling tubes, in tube passages provided in a tubular plate, by means of soft joints.

This invention relates more particularly to heat exchangers of which the core is constituted by metallic tubes which are circular, oblong or rectangular in shape, and to which are fixed heat disturbers as through brazing, soldering, crimping, glueing, etc.

In these apparatus, the main manufacturing problems and, later, the operating incidents, lie in the large number of connections which necessarily exist between the tubes of the core and the end plates in which they terminate; in many cases, these connections are realized through soft soldering or brazing between the tubes and the end plates, and the mechanical strength of such connections is often poor. Especially, when the end plates have a tendency to be moved in relation to the tubes, which happens due to changes in pressure and temperature to which these parts are submitted and also due to mechanical vibrations, it then happens that the connections between the tubes and the end plates are damaged thus causing leaks.

In the art of heat exchangers, it has already been offered to realize the tube-end plate connections by means of soft joints, but it was then necessary, up to now, to design said joints in a relatively complex shape to be adapted as well to the end plates as to the tubes, and it was required in most of the cases to inflate the tubes to distort the soft joints out of shape, which constitutes a delicate operation in mass production manufacturing.

The present invention provides to realize such a tight connection which is particularly efficient and which, besides, remains soft thereby eliminating the effects due to changes in pressure and to differential expansions between the various parts of the heat exchangers.

According to the invention, the method for assembling tubes in a tube plate comprises the steps of forming tube passages in said plate, said tube passages having a shape corresponding to that of the tube and a size slightly bigger than that of said tube;
placing a soft resilient sheet on one side of the tube plate;
forcibly inserting the tube into the tube passage of the tube plate through drape-covering the end of said tube by said soft resilient sheet whereby a portion of the soft resilient sheet covers the end of the tube; and
cutting said portion, whereby the inner stress of the material constituting said sheet restricts the portion of said sheet extending beyond the tube plate while forming a stressed flange pressing the tube wall and bearing on said tube plate.

The invention also relates to a tube and tube plate assembly embodying the above-mentioned method. According to this second arrangement of the invention, the tube and tube plate assembly comprises tubes of a given shape, at least one tube plate with tube passages of a shape corresponding to the given shape of said tubes and of a size slightly bigger than outer size of said tubes, the tubes being inserted in the tube-passages with a ring-shaped interval therebetween, and a soft resilient sheet having thickness bigger than said interval existing between respective walls of the tubes and of the tube passages, said sheet being inserted between each tube and the tube passage thereof and forming a flange beyond the tube-plate, said flange being held under stress and extending on a portion of the tube while bearing on the tube-plate.

Various other features of the invention are shown in the following detailed description.

Embodiments of the invention are shown by way of non-restrictive examples in the accompanying drawings in which:

FIG. 9 is a sectional view showing a development of this invention.

FIG. 10 is a sectional view taking along line X—X of FIG. 9.

FIGS. 11 and 12 are sectional views similar to FIG. 5 showing two other developments of this invention.

Figure 1:
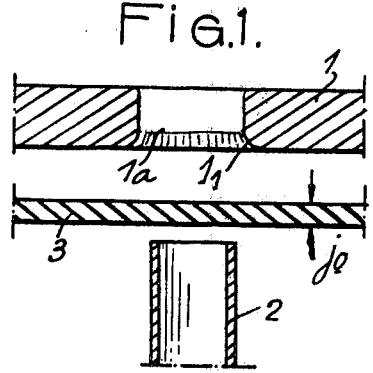
FIG. 1 is an exploded diagrammatic sectional view showing the main constituting elements of this invention.

In the drawings, 1 designates a tube plate in which must be tightly positioned a tube 2. The tube plate 1 can be constituted by an end plate of a heat exchanger of which the tube 2 is one of the circulation tubes.

For the assembling of the tube plate 1 and of the tube or tubes 2, there is provided that the inner size of the tube passages 1a in the plate 1 be slightly of a bigger diameter than that of the outer wall of the tube or tubes 2 which can indifferently have a circular section, an oblong section or a practically rectangular section of which the smaller sides are nevertheless preferably rounded. Between the plate 1 and the top of the tubes 2 there is placed a continuous sheet 3 made of soft and resilient material, typically rubber.

Figure 2:
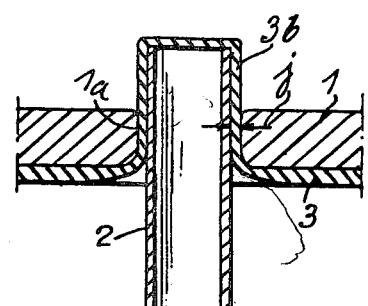
FIG. 2 is the view of FIG. 1 after performance of a first assembling step.

A second operation consists, as shown in FIG. 2 to introduce the tube or tubes 2 into the tube passages 1a, which has for its effect to drape-cover the portions of the sheet 3 driven by the tubes 2 on the end of the tubes while distorting the sheet 3 between the wall of the tube passage 1 and the outer wall of each tube 2. It can be seen in FIGS. 1 and 2 that the resulting thickness j of the sheet 3 pressed between the wall 1a and the corresponding wall of the tube is substantially thinner than thickness $j_o$ of the sheet 3 before being distorted.

Figure 3:
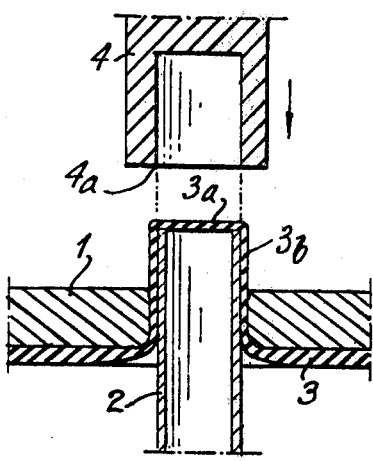
FIGS. 3 and 4 are sectional views showing performance of an additional step.

A next manufacturing step consists, as shown in FIG. 3, to cut away the portion 3a of the sheet 3 which covers the top of each tube 2. This cutting is made for example with a tool 4 shaped like a die of which the cutting edge 4a cooperates with the outer peripheral edge of the tube 2 then acting as a punch. The cutting tool can also be constituted by a punch 5 as shown in FIG. 4 and, in that case, the working edge 5a of that tool cooperates with the inner peripheral edge of the tube 2 which then acts as a die instead of working as a punch in the case previously illustrated in FIG. 4.

Figure 4:
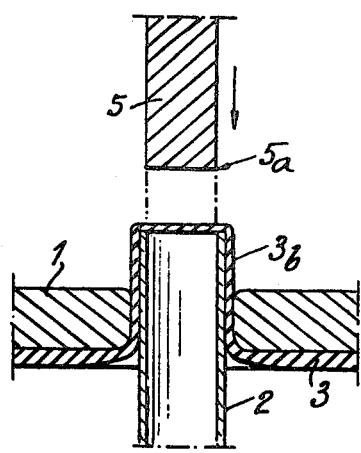
Figure 5:
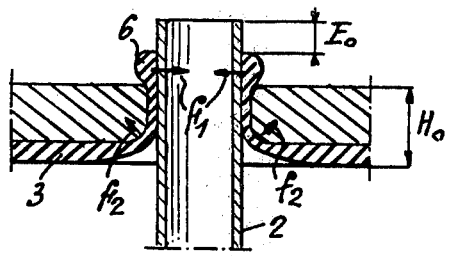
FIG. 5 is a sectional view showing a finished assembly.

FIGS. 2–4 show that the tube 2 must be inserted into the tubular plate 1 to substantially protrude above said plate. Thus, as soon as the cutting operation in the sheet 3 is performed, the portion 3b of said sheet which covers the lateral wall of the tube contracts and forms a flange 6 as shown in FIG. 5.

Under effect of a residual inner stress, the flange 6 is tightened with force against the tube and also on the top of the tube plate 1 and also against the bottom of said tube plate as shown, on one hand by arrows $f_1$ and, on the other hand by arrows $f_2$.

It is advantageous that the lower end of the tube passages 1a be slightly rounded as shown in $1_1$ (FIG. 1). This rounding facilitates sliding of the sheet 3 during insertion of each tube 2 and prevents the material of said sheet to support an exaggerated extension.

In the above described realization, which is represented in FIGS. 1–5, the tube plate 1 is shown as thick and can, for example, be made of molded material, especially of synthetic resin, glass or metal.

Figure 6:
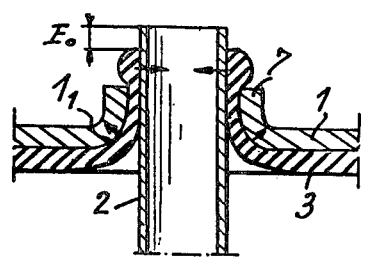
FIG. 6 is a sectional view similar to FIG. 5 of a variant.

This invention can be embodied in a similar way when the end plate 1 is made of metal which has been cut stamped as this is frequently the case for end plates of heat exchangers. In that case, to delimit the tube passages 1a continuous collars 7 are formed, in a well known way, which is represented in FIG. 6 which shows that there is obtained automatically the rounded shape $1_1$ against which slides the sheet 3 during insertion of each tube 1.

Figure 7:
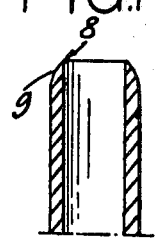
FIGS. 7 and 8 are sectional views of tubes showing a development of this invention for two particular realizations of said tubes.
Figure 8:
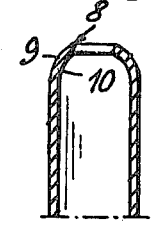

If desired, the cutting-away tools described in reference to FIGS. 3 and 4 can be avoided. In that case, the end of the tubes are shaped to define an edge 8 followed by a ramp 9 enabling the sheet 3 to slide along the walls of the tube to form the flange 6 (FIG. 7). When the wall of the tube is very thin whereby it would be then difficult to form the ramp 9, it is possible, as shown in FIG. 8 to reduce the diameter of the tube at its end as shown in 10, thus the ramp 9 is then automatically delimited.

When the tubes are of an oblong section, close to a rectangle, the pressure exerted by the flange 6 could distort the larger sides of this tube and, in that case, as shown in FIGS. 9 and 10, it is advantageous to place in the tubes a straightening element or stiffener 11 which is advantageously shaped as a corrugated fin, which causes the larger sides 2a, 2b of the tube to be perfectly cross-braced.

The position of the straightening element is preferably selected for its top to be at a distance E from the end of the tube as shown in FIG. 9, this distance E being smaller or equal to the distance $E_o$ (FIG. 5), i.e. to the distance of which the tube protrudes above the flange 6. The height H (FIG. 9) of the straightening element 11 must, on the other hand, be equal or higher than the measure $H_o$ (FIG. 5), i.e. the height of the segment of tube against which is more or less applied the joint formed by the sheet 3.

To prevent any sliding of the portion of sheet 3 which forms a sleeve 14 between the tube plate 1 and the tube wall, it is advantageous, in some cases, to slightly roughen the outer surface of the tube at least on the length H. It is also possible, as shown in FIG. 11 to fix onto the tube 2 a counter-plate 12 which, in the case of a heat exchanger, has the aspect of a false end-plate which can be soldered, brazed or glued to the tubes 2, without the requirement of any tightness between said plate and the tubes. Preferably, the plate 12 forms an upwards flange 13 tending to pinch the portion $3_1$ of the sheet 3 which is applied against the rounded portion $1_1$. There is thus prevented any back sliding of the sleeve 14 that said sheet $3_1$ delimits around each tube.

FIG. 12 shows another development of the description made above in reference to FIG. 11 and shows the application to a heat exchanger which comprises the counter-plate 12 held at its ends on a shoulder 15 formed by a lateral plate 16. In said realization, the counter-plate 12 is not necessarily soldered, brazed or glued to the tubes 2.

The invention is not restricted to the embodiments shown and described in detail, for various modifications thereof can moreover be applied thereto without departing from the scope of the invention, as shown in the appended claims. Especially, the reinforcement 11 can be constituted by a corrugated fin extending on whole height of the tubes 2.

I claim:

1. A tube and tube-plate assembly comprising tubes of a given shape and of a given outer size, at least one tube plate with tube passages of a shape corresponding to the given shape of said tubes and of a size slightly bigger than the given outer size of said tubes, the tubes being inserted in the tube passages with a ring-shaped interval therebetween and a soft resilient sheet having a thickness bigger than said interval existing between respective walls of the tubes and of the tube passages, said sheet bearing on the tube plate and having a portion extending between each tube and the tube passage thereof, thereby occupying said interval, said sheet further having an annular flange larger than said interval at a peripheral edge of the portion of the sheet occupying said interval, said flange being under stress and extending on a portion of the tube while bearing on the tube plate.

2. An assembly as set forth in claim 1, wherein the tubes are taken among tubes of round, oblong and rectangular cross-section.

3. An assembly as set forth in claim 1, wherein the tube plate has a round edge surrounding each tube passage on a side tube plate opposite that beyond which the tube protrudes.

4. An assembly as set forth in claim 3, wherein the round edge is formed by the base of a protruding collar delimiting each tube passage.

5. An assembly as set forth in claim 1, wherein the tube is at least partly roughened on portion thereof crossing the tube passage.

6. An assembly as set forth in claim 1, wherein a counter-plate with apertures is applied on one side of the resilient sheet inserted in the tube passage.

7. An assembly as set forth in claim 6, wherein the counter-plate delimits, on portion thereof crossing the tube passage, a protruding flange applying the resilient sheet against the tube plate.

8. An assembly as set forth in claim 1, wherein a reinforcing piece is placed inside each tube, top of said reinforcing plate extending beyond the flange of the resilient sheet which surrounds the tube.

9. An assembly as set forth in claim 8, wherein the reinforced piece is shaped as a corrugated fin delimiting cross-pieces between the two larger sides of each tube having a substantially rectangular cross-section.

* * * * *